United States Patent Office 3,121,729
Patented Feb. 18, 1964

3,121,729
CYCLOPENTADIENYL - NICKEL - CYCLOPENTE-
NYL COMPOUNDS AND PROCESSES THEREFOR
Ernst Otto Fischer, Munich-Solln, and Helmut Werner,
Munich, Germany, assignors to Union Carbide Corpo-
ration, a corporation of New York
No Drawing. Filed May 22, 1961, Ser. No. 121,787
Claims priority, application Germany July 3, 1959
9 Claims. (Cl. 260—439)

This invention relates to a novel class of organo-nickel compounds and to a process for producing them. More particularly, the invention is directed to a class of cyclopentadienyl-nickel-cyclopentenyl compounds which can be produced by the reaction of a cyclopentadiene hydrocarbon compound with nickel tetracarbonyl.

This application is a continuation-in-part of our co-pending application Serial No. 32,590, filed May 31, 1960, now abandoned.

The cyclopentadienyl-nickel-cyclopentenyl compounds of the present invention may be represented by the formula (A)     RNiR′ wherein R is a cyclopentadienyl hydrocarbon group and R′ is a cyclopentenyl hydrocarbon group. The R groups include the unsubstituted cyclopentadienyl group $C_5H_5$ and cyclopentadienyl groups substituted with one or more alkyl groups. Similarly, the R′ groups include the unsubstituted cyclopentenyl group $C_5H_7$ and cyclopentenyl groups substituted with one or more alkyl groups. Preferably, the R and R′ groups each contain from five to about eleven carbon atoms. The R and R′ moieties are bonded to the nickel atom through the formation of coordinate bonds between the five-membered ring portion of the R and R′ moieties and the nickel atom.

Examples of the compounds represented by Formula A are cyclopentadienyl-nickel-cyclopentenyl, methylcyclopentadienyl-nickel-methylcyclopentenyl, pentamethylcyclopentadienyl-nickel-pentamethylcyclopentenyl, methylisopropylcyclopentadienyl - nickel-methylisopropylcyclopentenyl, n-hexylcyclopentadienyl-nickel-n-hexylcyclopentenyl, and the like.

The compounds of this invention can in general be sublimed and dissolved in practically all organic solvents, in particular in aliphatic and aromatic hydrocarbons, alcohols, ketones, ethers, chlorinated hydrocarbons, carbon disulfide, nitriles, and the like. In many cases they are sensitive to air and can be decomposed at elevated temperatures. The compounds of this invention are diamagnetic and have a relatively small but measurable dipole moment.

The cyclopentadienyl-nickel-cyclopentenyl compounds of this invention can be produced by contacting in the liquid phase a cyclopentadiene hydrocarbon compound with nickel tetracarbonyl at a temperature between about 40° C. and 100° C. This process may be represented by the equation (B)     $2RH + Ni(CO)_4 \rightarrow RNiR' + 4CO$ wherein R and R′ have the meanings defined hereinabove with reference to Formula A and RH represents a cyclopentadiene hydrocarbon compound. The compounds RH include unsubstituted cyclopentadiene, $C_5H_6$, and cyclopentadienes substituted with one or more alkyl groups. Preferably, the compounds RH contain from five to about eleven carbon atoms.

In the process of this invention it has been found that, on the average, two RH molecules interact with each nickel tetracarbonyl molecule, one of the RH molecules losing a hydrogen atom and forming a cyclopentadienyl group (R) bonded to the nickel atom and the other RH molecule gaining a hydrogen atom and forming a cyclopentenyl group (R′) bonded to the nickel atom. Thus, for example, the reaction of unsubstituted cyclopentadiene with nickel carbonyl proceeds according to the equation $2C_5H_6 + Ni(CO)_4 \rightarrow (C_5H_5)Ni(C_5H_7) + 4CO$ Similarly, methylcyclopentadiene, pentamethylcyclopentadiene, methylisopropylcyclopentadiene and n-hexylcyclopentadiene react with $Ni(CO)_4$ to yield, respectively, methylcyclopentadienyl-nickel-methylcyclopentenyl, pentamethylcyclopentadienyl - nickel - pentamethylcyclopentenyl, methylisopropylcyclopentadienyl-nickel-methylisopropylcyclopentenyl and n-hexylcyclopentadienyl-nickel-n-hexylcyclopentenyl.

The reaction is generally carried out by contacting the reactants in an organic solvent. Suitable solvents are aliphatic hydrocarbon solvents such as petroleum ether, hexanes and heptanes, aromatic hydrocarbon solvents such as benzene, toluene and xylene, and ether solvents such as diethyl ether, tetrahydrofuran and ethylene glycol dimethyl ether. The reaction can also be carried out without a solvent whenever the cyclopentadiene hydrocarbon reactant is a liquid. The process is preferably carried out by heating the reactants at relatively low temperatures, the reaction temperature ranging from about 40° C. to about 100° C. In general, the reactants are contacted under an inert atmosphere, such as nitrogen gas for instance, and at ordinary (atmospheric) pressure. In some instances, the application of an increased pressure is advisable, for example where the atmospheric pressure boiling point of the reaction mixture is relatively low and a higher reaction temperature is desired in order to increase the rate of reaction.

Stoichiometric amounts of reactants (that is, 2 moles of cyclopentadiene hydrocarbon per mole of nickel tetracarbonyl) can be used, although it has been found that an excess of one of the reactants, preferably the cyclopentadiene, is advisable. The reactant ratio most preferred is about 5 moles of cyclopentadiene hydrocarbon to one mole of nickel tetracarbonyl.

The reactants can be mixed together in bulk prior to heating, but it has been found preferable to mix the reactants by adding the nickel tetracarbonyl in small increments to the cyclopentadiene hydrocarbon. The length of time the reactants are contacted at the reaction temperature is not critical and the time can be selected to give a convenient rate of reaction at the temperature employed. Suitable reaction times are from about six hours to about twenty-four hours.

The compound of Formula A can be conveniently recovered from the reaction mixture by removing the solvent followed by sublimation of the residue under reduced pressure. This recovery procedure is described in more detail in Example I below.

It has been found that the known dicyclopentadienyl-complexes of nickel, for instance $(C_5H_5)_2Ni$, are formed as by-products of the reaction, generally in small quantities of the order of magnitude of 5 weight percent.

The unusual structure of the compounds of this invention has been confirmed by nuclear magnetic resonance techniques. The nuclear magnetic resonance measurements were carried out according to conventional procedures at an operating frequency of 40 megacycles on benzene solutions of cyclopentadienyl-nickel-cyclopentenyl, $C_{10}H_{12}Ni$; tetramethylsilane was used as an inner standard. The results are summarized in the following table.

CHEMICAL SHIFTS, INTENSITIES AND ASSIGNMENTS FOR $C_{10}H_{12}Ni$ IN BENZENE

| Chemical Shifts: | | | | |
|---|---|---|---|---|
| (a) Cycles per second | +31 | +37 | +83.5 | +199 |
| (b) Relative to tetramethylsilane | 4.72 | 4.87 | 6.04 | 8.93 |
| Intensity Ratio | 5 | 1 | 2 | 4 |
| Assignment in accordance with Formula 1 | $H_C$ | $H_X$ | $H_A$ | $H_B$ |

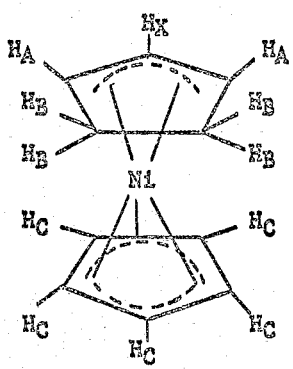

Formula 1

The nuclear magnetic resonance measurements show four different classes of hydrogen atoms, and the intensity ratios are in full agreement with the structure set forth in Formula 1. A similar nuclear magnetic resonance spectrum was obtained for methylcyclopentadienyl-nickel-methylcyclopentenyl.

The nuclear magnetic resonance measurements described above and the conformation of the structure of the cyclopentadienyl-nickel-cyclopentenyl compounds of this invention are discussed in more detail in our paper entitled "Zür Struktur von $NiC_{10}H_{12}$ und $PdC_{11}H_{14}$," published in Tetrahedron Letters, No. 1, pp. 17–20, 1961.

The structure set forth in Formula 1 is also in conformity with the observed diamagnetism and weak dipole moment of the compounds of this invention. A cyclopentadienyl radical has five non-localized (pi) electrons through which the five-membered ring is bonded to the nickel atom and a cyclopentenyl radical has three such bonding electrons in the five-membered ring. The free nickel atom has ten bonding electrons, and the addition of eight bonding electrons by the cyclopentadienyl and cyclopentenyl groups to form the compounds of this invention gives the nickel atom the stable and diamagnetic electron configuration of the inert gas krypton. The fact that the cyclopentadienyl and cyclopentenyl groups are not identical results in a slightly unsymmetrical electron distribution and accounts for the observed weak dipole moment.

The new compounds of the present invention are particularly useful as catalysts in organic synthesis and can be used as anti-knock compounds, either alone or in mixture with other organometallic compounds, in motor fuels and the like.

The compounds of this invention are also useful as plating agents for depositing a nickel coating on platable substrates. When a compound of formula A and a platable substrate are contacted at a temperature above the decomposition temperature of the cyclopentadienyl-nickel-cyclopentenyl compound, an adherent film of nickel metal is deposited on the substrate. For example, a quantity of cyclopentadienyl-nickel-cyclopentenyl and a strip of dry glass cloth are sealed in an evacuated glass tube. The tube is heated to about 180° C. for about one hour. A thin film of nickel metal is deposited on the glass fibers, thus producing a conducting cloth which does not accumulate a charge of static electricity.

The following examples are illustrative of the present invention.

*Example I*

A 150 milliliter three-necked flask fitted with a stirrer, reflux condenser, a mercury pressure valve and a dropping funnel was filled under nitrogen with a mixture of 16.5 milliliters (0.2 mole) of freshly distilled cyclopentadiene and 100 milliliters of dry normal hexane. About 5.5 milliliters (0.04 mole) of $Ni(CO)_4$ were added dropwise with stirring over a period of one hour at room temperature. The lemon yellow reaction mixture was heated to 70° C. and stirred for eighteen hours at this temperature. The reaction product was filtered under exclusion of air through a fritted glass filter into a 250 milliliter flask and a portion of the solvent was evaporated at 40° C. under vacuum. The intensively colored liquid remaining was freed from solvent as much as possible by treatment for five hours under a vacuum of 2 to 3 millimeters of mercury.

The flask was connected to a large finger-condenser cooled with liquid nitrogen and the residue heated to 60° C. to 70° C. in high vacuum. After approximately 6 hours the principal part of the reaction product had sublimed onto the cold surface of the condenser. The product, pre-purified in this fashion, was then dried by maintaining it at 10° C. to 12° C. for eight hours at 2 millimeters of mercury in order to remove the last trace of solvent. The now completely dry residue was then sublimed in high vacuum at 4° C. to 5° C. The cyclopentadienyl-nickel-cyclopentenyl product was obtained in red needles. The yield (1.4 grams) was 18 percent based on $Ni(CO)_4$.

The red crystals melted under nitrogen at 41° C. to 42° C. without decomposition to give a red liquid. The liquid decomposed on further heating at 160° C. to 180° C. The crystals were diamagnetic and had a dipole moment in cyclohexane at 25° C. of 1.16±0.07 Debye units. The presence of the >$CH_2$ group in the product was confirmed by infrared spectrographic analysis. The molecular weight of the product was found to be 183 by cryoscopic determination in benzene. The theoretical molecular weight for $C_{10}H_{12}Ni$ is 190.9.

*Analysis.*—Calc. for $C_{10}H_{12}Ni$: C, 62.92%; H, 6.34%; Ni, 30.74%. Found: C, 62.78%; H, 6.35%; Ni, 30.65%.

*Example II*

Following the procedure of Example I, cyclopentadiene and $Ni(CO)_4$ were contacted in benzene solvent at the atmospheric pressure boiling point of the reaction mixture to produce cyclopentadienyl-nickel-cyclopentenyl. The yield was lower than when normal hexane was employed as the solvent as in Example I.

*Example III*

Following the procedure of Example I, methylcyclopentadiene and $Ni(CO)_4$ were mixed in normal hexane and heated to produce methylcyclopentadienyl-nickel-methylcyclopentenyl, $(CH_3C_5H_4)Ni(CH_3C_5H_6)$. The methylcyclopentadienyl-nickel-methylcyclopentenyl is an oily red liquid which can be purified by distillation.

*Analysis.*—Calc. for $C_{12}H_{16}Ni$: C, 65.83%; H, 7.37%; Ni, 26.80%. Found: C, 66.30%; H, 7.48%; Ni, 26.54%.

What is claimed is:

1. The cyclopentadienyl-nickel-cyclopentenyl compounds represented by the formula RNiR′, wherein R is selected from the class consisting of the cyclopentadienyl group and alkyl-substituted cyclopentadienyl groups, R′ is selected from the class consisting of the cyclopentenyl group and alkyl-substituted cyclopentenyl groups, and R and R' each contain from five to about eleven carbon atoms.

2. Cyclopentadienyl-nickel-cyclopentenyl.

3. Methylcyclopentadienyl-nickel-methylcyclopentenyl.

4. A process for producing cyclopentadienyl-nickel-cyclopentenyl compounds which comprises contacting in the liquid phase at a temperature between about 40° C. and about 100° C. a cyclopentadiene hydrocarbon compound containing from five to about eleven carbon atoms and selected from the class consisting of cyclopentadiene and alkyl-substituted cyclopentadienes with nickel tetracarbonyl.

5. The process in accordance with claim 4 wherein said cyclopentadiene hydrocarbon compound is unsubstituted cyclopentadiene, $C_5H_6$.

6. The process in accordance with claim 4 wherein said cyclopentadiene hydrocarbon compound is methylcyclopentadiene.

7. The process in accordance with claim 4 wherein said cyclopentadiene hydrocarbon compound and said nickel tetracarbonyl are contacted in an organic solvent.

8. The process for producing cyclopentadienyl-nickel-cyclopentenyl which comprises contacting cyclopentadiene and nickel tetracarbonyl in normal hexane solvent at a temperature of about 70° C.

9. The process for producing methylcyclopentadienyl-nickel-methylcyclopentenyl which comprises contacting methylcyclopentadiene and nickel tetracarbonyl in normal hexane solvent at a temperature of about 70° C.

References Cited in the file of this patent

UNITED STATES PATENTS 2,922,805    Kaufman _____ Jan. 26, 1960